United States Patent
Vijayshankar et al.

(10) Patent No.: US 8,740,073 B2
(45) Date of Patent: Jun. 3, 2014

(54) METHODS, SYSTEMS AND COMPUTER READABLE MEDIA FOR STORING AND REDEEMING ELECTRONIC CERTIFICATES USING A WIRELESS SMART CARD

(75) Inventors: Roshan Vijayshankar, Santa Clara, CA (US); Ming-Li Liu, Menlo Park, CA (US); Sridhar Gudihala, Cupertino, CA (US)

(73) Assignee: Mastercard International Incorporated, Purchase, NY (US)

( * ) Notice: Subject to any disclaimer, the term of this patent is extended or adjusted under 35 U.S.C. 154(b) by 303 days.

(21) Appl. No.: 12/184,847

(22) Filed: Aug. 1, 2008

(65) Prior Publication Data

US 2010/0030636 A1 Feb. 4, 2010

(51) Int. Cl.
*G06K 7/08* (2006.01)

(52) U.S. Cl.
USPC ....................................................... 235/451

(58) Field of Classification Search
USPC ....................................................... 235/451
See application file for complete search history.

(56) References Cited

U.S. PATENT DOCUMENTS

| | | |
|---|---|---|
| 7,209,733 B2 | 4/2007 | Ortiz et al. |
| 7,469,151 B2 | 12/2008 | Khan et al. |
| 2004/0072592 A1 | 4/2004 | Hasegawa |
| 2004/0243519 A1 | 12/2004 | Perttila et al. |
| 2005/0070257 A1 | 3/2005 | Saarinen et al. |
| 2006/0165060 A1 | 7/2006 | Dua |
| 2006/0236325 A1 | 10/2006 | Rao et al. |
| 2006/0287964 A1 | 12/2006 | Brown |
| 2007/0042756 A1 | 2/2007 | Perfetto et al. |
| 2007/0099599 A1 | 5/2007 | Smith et al. |
| 2007/0152829 A1* | 7/2007 | Lindsay et al. ............ 340/572.3 |

(Continued)

FOREIGN PATENT DOCUMENTS

| | | |
|---|---|---|
| EP | 1 501 038 A1 | 1/2005 |
| KR | 10-2003-0080111 | 10/2003 |

(Continued)

OTHER PUBLICATIONS

Notification of Transmittal of the International Search Report and the Written Opinion of the International Searching Authority, or the Declaration for International Application No. PCT/US2009/052618 (Mar. 30, 2010).

(Continued)

*Primary Examiner* — Michael G Lee
*Assistant Examiner* — David Tardif
(74) *Attorney, Agent, or Firm* — Jenkins, Wilson, Taylor & Hunt, P.A.

(57) ABSTRACT

Methods, systems, and computer readable media for storing and redeeming an electronic certificate on a wireless smart card are disclosed. According to one aspect, the method includes storing tag data on a wireless smart card that is inductively powered when brought into the proximity of an electromagnetic field and is unpowered when outside of the proximity of the field. Tag data is received from a wireless smart card at a wireless smart device reader during an electronic transaction, wherein the card is powered by an electromagnetic field generated by the device reader. The method also includes sending, from the wireless smart device reader, transaction data, which includes at least the tag data and a vendor identifier, to a back-end server. At the wireless smart device reader, an electronic certificate is received from the server, the electronic certificate being obtained by the server using the tag data and the vendor identifier.

17 Claims, 3 Drawing Sheets

(56) References Cited

U.S. PATENT DOCUMENTS

| | | | |
|---|---|---|---|
| 2007/0203792 A1 | 8/2007 | Rao | |
| 2007/0241183 A1* | 10/2007 | Brown et al. | 235/380 |
| 2008/0040354 A1 | 2/2008 | Ray et al. | |
| 2008/0183722 A1* | 7/2008 | Lane et al. | 707/100 |
| 2008/0257958 A1* | 10/2008 | Rothwell et al. | 235/380 |
| 2009/0164322 A1 | 6/2009 | Khan et al. | |
| 2010/0075666 A1* | 3/2010 | Garner | 455/426.1 |
| 2010/0185504 A1 | 7/2010 | Rajan et al. | |
| 2011/0060637 A1 | 3/2011 | Sakai et al. | |
| 2011/0307318 A1 | 12/2011 | LaPorte et al. | |
| 2013/0238456 A1 | 9/2013 | Soysa et al. | |

FOREIGN PATENT DOCUMENTS

| | | |
|---|---|---|
| KR | 10-2004-0000712 | 1/2004 |
| WO | WO 2008/030307 A2 | 3/2008 |
| WO | WO 2011/112158 A1 | 9/2011 |
| WO | WO 2013/134769 A1 | 9/2013 |

OTHER PUBLICATIONS

Commonly-assigned, co-pending U.S. Appl. No. 12/651,420 for "Methods, Systems and Computer Readable Media for Redeeming and Delivering Electronic Loyalty Reward Certificates Using a Mobile Device," (filed Dec. 31, 2009).

Communication of European Publication Number and Information on the Application of Article 67(3) EPC for European Patent No. 2062219 (Apr. 29, 2009).

Commonly-assigned, co-pending U.S. Appl. No. 12/406,916 for "Methods, Systems and Computer Readable Media for Selecting and Delivering Electronic Value Certificates Using a Mobile Device," (filed Mar. 18, 2009).

Notice of Allowability for U.S. Appl. No. 11/514,698 (Nov. 17, 2008).

Notice of Allowance and Fee(s) Due for U.S. Appl. No. 11/514,698 (Aug. 28, 2008).

Notification for Transmittal of the International Search Report and the Written Opinion of the International Searching Authority, or the Declaration for the International Application No. PCT/US07/17091 (Jun. 26, 2008).

Extended European Search Report for European Patent Application No. 09803712.0 (Mar. 19, 2013).

Aigner et al., "A Sytem of Secure Virtual Coupons Using NFC Technology," Proceedings of the Fifth Annual IEEE International Conference on Pervasive Computing and Communications Workshops, pp. 1-6 (2007).

Notification of Transmittal of the International Search Report and the Written Opinion of the International Searching Authority, or the Declaration for International Application No. PCT/US2013/030216 (Jun. 20, 2013).

"Information technology—Telecommunications and information exchange between systems—Near Field Communications—Interface and Protocol (NFCIP-1)," ISO/IEC 18092, pp. 1-66 (Apr. 1, 2004).

"Identification cards—Contactless integrated circuit(s) cards—Proximity cards—Part 2: Radio frequency power and signal interface," ISO/IEC 14443-2, pp. 1-10 (Jul. 22, 2003).

"Identification cards—Contactless integrated circuit(s) cards—Proximity cards—Part 4: Transmission protocol," ISO/IEC 14443-4, pp. 1-39 (Mar. 10, 2000).

"Identification cards—Contactless integrated circuit(s) cards—Proximity cards—Part 3: Initialization and anticollision," ISO/IEC 14443-3, pp. 1-48 (Jun. 11, 1999).

\* cited by examiner

| | LOCATION ID | TIME | VENDOR ID | CERTIFICATE |
|---|---|---|---|---|
| 212 | #1741 (MAIN STREET HALL) | JAN 1, 2008 - JANUARY 31, 2008 | #2584 (COFFEE WORLD) | $1.00 COFFEE |
| 214 | #1741 (MAIN STREET HALL) | JAN 1, 2008 - MAR 31, 2008 | #3842 (BAGEL SHOPPE) | FREE BAGEL |
| 216 | #1742 (GROCERY STORE) | JAN 15, 2008 - JUNE 31, 2008 | #3781 CINEMA | FREE MOVIE TICKET |
| 218 | #1743 (MOVIE THEATRE) | JAN 15, 2008 - MAY 1, 2008 | #3781 CINEMA | $2.00 OFF OF POPCORN |

FIG. 2

METHODS, SYSTEMS AND COMPUTER READABLE MEDIA FOR STORING AND REDEEMING ELECTRONIC CERTIFICATES USING A WIRELESS SMART CARD

TECHNICAL FIELD

The subject matter described herein relates to conducting various electronic transactions without using a near field communications (NFC) enabled handset. More particularly, the subject matter described herein relates to methods, systems, and computer readable media for storing and redeeming electronic certificates using a wireless smart card without using a near field communications (NFC) enabled handset.

BACKGROUND

Currently, the primary means for acquiring, storing, and redeeming electronic coupons, promotions, tickets, and the like, involves the use of a near field communications (NFC) enabled mobile phone handset. Very few mobile phones presently in use, however, are actually configured to conduct NFC proximity payment transactions. Notably, this significant deficiency of deployed NFC enabled phones is hindering the widespread adoption of conducting NFC proximity payments. More specifically, although it is extremely likely that NFC payment transactions will become a common practice in the future, the fact that so few NFC enabled handsets are currently available is delaying the process.

Several reasons contribute to the lack of a large scale deployment of NFC enabled handsets. For example, many businesses and retailers have been slow to install NFC proximity payment readers in their stores due to, not surprisingly, the scarcity of customers utilizing NFC enabled handsets. Similarly, potential customers do not feel compelled to buy NFC enabled handsets, which may be considerably expensive, since there is a lack of businesses employing the technology. Thus, before NFC enabled handsets are used by a significant portion of the population, a critical mass needed to promote the proliferation of NFC transactions has to be established.

This dilemma may be addressed by the use of inexpensive contactless cards to conduct certain electronic transactions, such as redeeming electronic certificates (e.g., electronic coupons or tickets). Due to the fact that they may be cheaply obtained and can easily be configured to store coupon or ticket information, contactless cards may serve as an affordable vehicle to introduce potential customers to NFC proximity transactions. Similarly, the increasing number of customers using the cards will likely compel vendors to implement wireless smart device readers in their stores, thus eventually creating a critical mass needed to promote widespread acceptance of proximity payments.

Accordingly, there exists a need for affordable and improved methods, systems, and computer readable media for storing and redeeming electronic certificates using a wireless smart card without the use of an NFC enabled mobile phone.

SUMMARY

Methods, systems, and computer readable media for storing and redeeming an electronic certificate on a wireless smart card are disclosed. According to one aspect, the method includes storing tag data on a wireless smart card that is inductively powered when brought into the proximity of an electromagnetic field and that is unpowered when outside of the proximity of the electromagnetic field. The tag data is received from a wireless smart card at a wireless smart device reader during an electronic transaction, wherein the wireless smart card is powered by an electromagnetic field generated by the wireless smart device reader. The method also includes sending, from the wireless smart device reader, transaction data, which includes at least the tag data and a vendor identifier, to a back-end server. At the wireless smart device reader, an electronic certificate is received from the back-end server, the electronic certificate being obtained by the back-end server using the tag data and the vendor identifier.

As used herein, the term "wireless smart card" refers to a device with a card or fob form factor that is unpowered when outside the proximity of an electromagnetic field and powered when within proximity of an electromagnetic field. The term "wireless smart card" is not intended to include a mobile telephone handset.

As used herein, the term "tag data" refers to information received from an RFID tag. Examples of tag data that may be received include coupons, tickets, or other promotional items.

The subject matter described herein for storing and redeeming an electronic certificate may be implemented using a computer readable medium having stored thereon computer executable instructions that when executed by the processor of a computer perform steps of the aforementioned method (see above). Exemplary computer readable media suitable for implementing the subject matter described herein includes disk memory devices, programmable logic devices, and application specific integrated circuits. In one implementation, the computer readable medium may include a memory accessible by a processor. The memory may include instructions executable by the processor for implementing any of the methods for storing and redeeming an electronic certificate described herein. In addition, a computer readable medium that implements the subject matter described herein may be distributed across multiple physical devices and/or computing platforms.

BRIEF DESCRIPTION OF THE DRAWINGS

The subject matter described herein will now be explained with reference to the accompanying drawings of which:

FIG. 2 is a block diagram of an exemplary database for storing electronic certificates according to an embodiment of the subject matter described herein.

DETAILED DESCRIPTION

Figure 1:
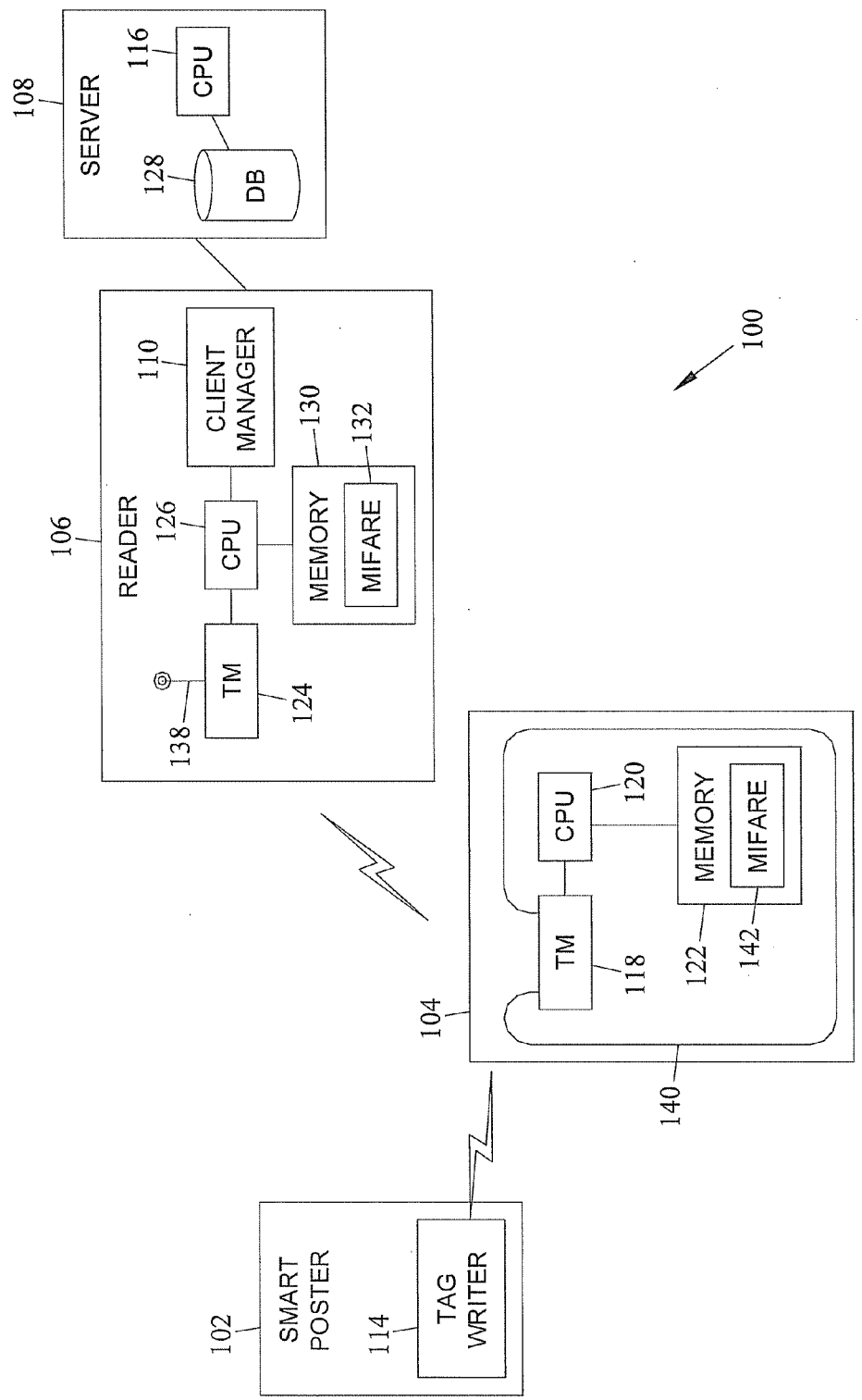
FIG. 1 is a block diagram of an exemplary system for storing and redeeming electronic certificates using a wireless smart card according to an embodiment of the subject matter described herein.

FIG. 1 is a block diagram of an exemplary system for storing and redeeming electronic certificates, such as coupons, promotions, vouchers, tickets, and the like, without depending on a powered near field communications (NFC) enabled handset according to an embodiment of the subject matter described herein. In FIG. 1, system 100 includes a smart poster 102, a wireless smart card 104, a wireless smart device reader 106, and a back-end server 108. Generally, a smart poster is embodied as a sign, billboard, or any other form of advertising that incorporates a passive NFC tag (e.g., an RFID tag) from which a user can extract tag data by interfacing an NFC enabled handset with the tag. The tag data acquired may be a free ringtone, a uniform resource locator (URL), a coupon, a ticket, a promotion, or any other type of data. In system 100, however, smart poster 102 is equipped with a powered tag writer device 114. Notably, tag writer device 114 may be configured to transmit information to wireless smart card 104 (which is typically an unpowered contactless card) when wireless smart card 104 is placed in close proximity to tag writer device 114. For example, rather than using a powered NFC enabled device (e.g., an NFC enabled mobile phone) to acquire or "pull" data from a passive tag of a smart poster, the present subject matter involves the "pushing" of information from a powered tag writer device 114 to an initially unpowered wireless smart card 104. This configuration is advantageous because an inexpensive contactless proximity card may be used in place of an expensive NFC enabled handset to acquire the tag data. In one embodiment, smart poster 102 may be embodied as a kiosk or other station that includes a tag writer device 114. In addition, tag writer device 114 may be powered by a battery source in order to accommodate portable applications.

In one embodiment, tag writer device 114 is configured to write its data to a designated sector in wireless smart card 104. The tag data to be written may include information such as a location identifier (i.e., which indicates the location of the smart poster) and a time stamp identifier. The time stamp identifier may include a simple tag that indicates the recorded date and time of when wireless smart card 104 interfaced with (i.e., obtains data from) smart poster 102. In another embodiment, the tag data may include a certificate identifier (e.g., a unique numeric identifier that identifies a particular coupon, ticket, promotion, etc.).

In one embodiment, wireless smart card 104 is initially unpowered device, such as a proximity integrated circuit card (PICC) or any other contactless card (e.g., a MIFARE® card), with processing capabilities capable of communicating with another device, such a wireless smart device reader 106, tag writer 114, or some other like wireless terminal, via an electromagnetic field. Wireless smart card 104 may comprise a central processing unit (CPU) 120, transceiver module 118, programmable on-board memory 122, and loop antenna 140, which can be collectively utilized to execute applications and communicate with other devices, such as wireless smart device reader 106. Examples of wireless smart cards may include key fobs and physical cards, such as a polyvinyl chloride (PVC) contactless card.

In one embodiment, wireless smart card 104 may be embodied as a MIFARE® PVC card that includes four kilobyte electrically erasable programmable read-only memory (EEPROM), organized in 32 sectors with 4 blocks or organized in eight sectors with 16 blocks (i.e., one block consist of 16 bytes). The last block of each sector in the memory is called the "sector trailer," which may contain one or more secret keys and programmable access conditions for each sector. A predetermined sector of this card may be configured to store read-only values, such as a unique identifying number associated with the card.

CPU 120 may include any type of processor, microcontroller, and like hardware component that executes various software programs to control the operations of wireless smart card 104. In one embodiment, CPU 120 may instead be embodied as an application specific integrated circuit (ASIC). CPU 120 may also be configured to communicate with transceiver module 118 by providing instructions via load modulations on antenna 140 in order to transmit data to other devices, such as wireless smart device reader 106. An exemplary communications process is described below.

Programmable on-board memory 122 may be an electronically erasable programmable read only memory (EEPROM), a read-only memory (ROM), or some other suitable type of memory for storing one or more applications for performing various functions. For example, wireless smart card 104 may include a MIFARE® application 142 located in memory 122 for performing MIFARE® transactions. As used herein, the term "MIFARE® application" refers to an application stored on a wireless smart card that complies with the MIFARE® standard. The MIFARE® wireless smart card standard is a proprietary technology based on the ISO 14443 Type A specification.

In one embodiment, MIFARE® application 142 may include a set of instructions for conducting MIFARE® transactions (per the MIFARE® standard). Although application 142 is shown to be a MIFARE® specific application, other applications (e.g., an ISO-14443 application) may be stored in memory 122 and used for executing various wireless transactions without departing from the scope of the present subject matter.

MIFARE® application 142 may be any suitable type of MIFARE® application. For example, MIFARE® application 142 may implement various electronic certificates such as coupons, customer loyalty cards, promotions, and access tickets. In one embodiment, MIFARE® application 124 may implement a simple coupon that entitles the customer to a discount on the purchase of a specific item. For example, the coupon can be used to reduce the amount owed by the user of wireless smart card 104 at the time of purchase. In one embodiment, a coupon for 35 cents off of a good is electronically presented to wireless smart device reader 106 (by a customer using device 104) in order to reduce the price of purchased good from $2.75 to $2.40.

In yet another example, MIFARE® application 142 may include a ticket that controls access to a location or event. For example, device 104 may store a value that may be incremented or decremented by reader 106, which may function as an access control mechanism for online or offline validation. In one implementation, a user may purchase three movie tickets that provide the user with access to a movie. A value stored on the card may be decremented each time a ticket is used. In this scenario, no discount is necessarily received by the user and no goods are necessarily purchased. Rather, use of wireless smart card 104 may be viewed as a redemption, by the user, of a ticket obtained from tag writer 114 (e.g., tag writer 114 may provide a free promotion ticket).

In one embodiment, antenna 140 may be embodied as a loop antenna as illustrated in FIG. 1. Antenna 140 may be used to transmit and receive signals from other devices via an electromagnetic field. Although FIG. 1 depicts antenna 140 as a loop antenna, any other type of antenna that is appropriate for communicating via NFC may be used. Similarly, it is appreciated that other types or configurations of the components within wireless smart card 104 may be implemented without departing from the scope of the subject matter described herein.

In one embodiment, wireless smart card 104 may communicate wirelessly with wireless smart device reader 106 (e.g., a proximity coupling device (PCD)) to conduct an electronic transaction such as using a coupon, redeeming a ticket, or the like. Namely, wireless smart card 104 may communicate with a powered wireless smart device reader 106 using a wireless communications technology, such as near field communication (NFC). Specifically, NFC involves communication via magnetic field induction, where two loop antennas are located within each other's near field, which effectively forms an air-core transformer. For example, wireless smart card 104 may communicate with wireless smart device reader 106 via inductive coupling of the reader antenna 138 to the device antenna 140.

In one embodiment, wireless smart device reader 106 modulates the loading on loop antenna 138 in order to amplitude-modulate a radio frequency (RF) field/electromagnetic field. The modulations in the field are received and detected by antenna 140 located on wireless smart card 104, thereby communicating information. In order to communicate, transceiver module 124 may transmit a command signal to wireless smart card 104 via the electromagnetic field (or some other energy field) powered by reader 106. For example, by oscillating the electromagnetic field on and off very quickly, transceiver module 124 is able to send a command as a string of data to wireless smart card 104. Similarly, by drawing power from the electromagnetic field, wireless smart card 104 is able to send a response to wireless smart device reader 106 by creating a short circuit on its own antenna 140. The short circuit produces a larger load on antenna 138, which is promptly detected as a communication from wireless smart card 104. An example of near-field wireless communications standard commonly used by wireless smart cards is ISO 14443.

In one embodiment, wireless smart device reader 106 may include a CPU 126, a client manager 110, a transceiver module 124, and memory 130. Memory 130 may include any type of storage means for storing software programs and other information used for performing wireless transactions with wireless smart card 104. For example, memory 130 may include a MIFARE® transaction module 132. MIFARE® transaction module 132 may include instructions for reading and/or writing data to MIFARE® memory, such as MIFARE application 142. Module 132 may also include a proprietary command set and security algorithm for performing MIFARE® transactions as part of a transaction.

Wireless smart device reader 106 may comprise a CPU 126 for executing instructions stored in memory 130 and other various tasks. For example, central processing unit (CPU) 126 may communicate with module 132 in order to perform a MIFARE® transaction. Additionally, CPU 126 may communicate with transceiver control module 124 to transmit data to and receive data from wireless smart card 104. For example, transceiver control module 124 may be configured by CPU 126 to modulate the amplitude of an electromagnetic field by adjusting the load on antenna 138, thereby transmitting and receiving data with wireless smart card 104 in a manner similar as described above with respect to transceiver module 118.

Wireless smart device reader 106 may also include a client manager 110. In one embodiment, client manager 110 is a software application that serves as an interface between wireless smart device reader 106 and server 108. For example, upon receiving tag data from wireless smart card 104, wireless smart device reader 106 passes the tag data to client manager 110. Client manager 110 may then transmit transaction data, which includes the received tag data and a vendor identifier (which identifies the merchant and/or merchant location of the wireless smart device reader 106), and sends the transaction data to server 108.

Server 108 may include any type of computing device capable of maintaining and accessing databases in order to locate and acquire appropriate coupon, ticket, and promotional data. In one embodiment, server 108 includes a CPU 116 and certificate database 128. CPU 116 may include any processor or controller that is capable of accessing database 128 for the purpose of obtaining coupons, tickets, promotions, and the like. For example, after receiving the transaction data (e.g., tag data and a vendor identifier) from client manager 110, CPU 116 cross-references the data with the entries of certificate database 128.

In one embodiment, database 128 is organized by mapping a multitude of electronic certificates (e.g., coupons, promotions, tickets, etc.) to corresponding location identifiers (i.e., which indicate the location of the tag writer providing the certificate), time periods of validity (i.e., which can be used to differentiate different coupons/tickets offered at a tag writer location at different times), and a merchant vendor identifier (i.e., which can be used to correlate the certificate being used and the vendor that the coupon is being presented to, as well as to reduce the number of entries searched in database 128).

FIG. 2 depicts a block diagram of an exemplary database 200 (e.g., an embodiment of database 128) for storing electronic certificates according to an embodiment of the subject matter described herein. Although database 200 shows a simple database with four entries and four columns, other databases that vary from the format shown in FIG. 2 may be utilized without departing from the scope of the present invention. In FIG. 2, database 200 includes a location column 202, a time column 204, a merchant column 206, and a certificate column 208. Database 200 also includes entries 212-218. As mentioned above, CPU 116 in server 108 accesses database 200 (represented as database 128 in FIG. 1) after receiving transaction data from reader 106. In one embodiment, the transaction data may include tag data that comprises a location identifier (e.g., the mall) and a time stamp (e.g., Jan. 15, 2008). The transaction data may also include a merchant identifier (e.g., "Coffee World") associated with reader 106. CPU 116 may then execute a program that cross-references the transaction data with entries 212-218 of database 200. If a match exists between the transaction data and the first three columns (e.g., columns 202-206), then the certificate found in column 208 may be identified and provided to reader 106. If an appropriate match cannot be found among entries 212-218, then a notification may be sent to reader 106. In this scenario, because entry 212 corresponds to the above transaction data (e.g., the mall, Jan. 15, 2008, and Coffee World), a $1.00 coupon for coffee may be identified and provided to reader 106.

After cross referencing the transaction data received from client manager 110 with entries of database 128, CPU 116 may then determine whether a valid certificate associated with the current electronic transaction being conducted at reader 106 exists. If a valid certificate was located (i.e., identified after cross referencing the data with the database entries), server 108 may provide the certificate to client manager 110. If a valid certificate was not located (e.g., if the coupon was determined to have expired, an error occurred, etc.), then server 108 may be configured to transmit a notification message to client manager 110.

Figure 3:
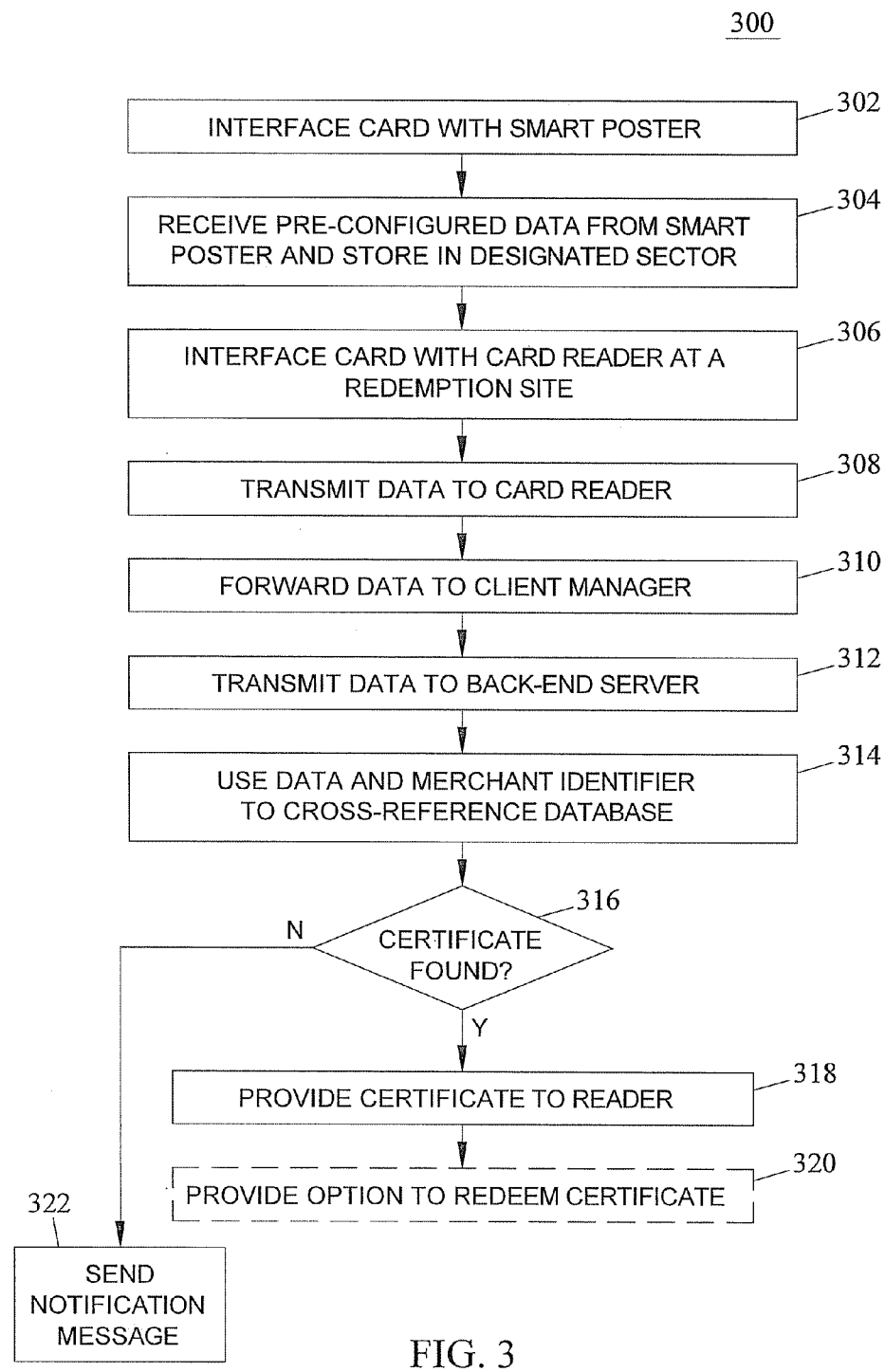
FIG. 3 is a flow chart of an exemplary process for storing and redeeming electronic certificates using a wireless smart card according to an embodiment of the subject matter described herein.

To better illustrate the interworking of the components FIG. 1 to conduct an electronic transaction, FIG. 3 is provided to describe the transaction process using a flow diagram. Specifically, FIG. 3 is a flow chart of an exemplary method 300 for storing and redeeming electronic certificates without depending on an NFC enabled handset according to an embodiment of the subject matter described herein.

In block 302, a wireless smart card is interfaced with a tag writer. In one embodiment, wireless smart card 104 is placed into proximity with tag writer 114 on smart poster 102. At this time, tag writer 114 and wireless smart card 104 may perform a handshaking procedure to acknowledge the presence of the other device. Notably, the power from tag writer 114 may be use to activate wireless smart card 104 via the electromagnetic field established for communications.

In block 304, pre-configured data is received from the tag writer and stored in a designated sector. In one embodiment, tag writer 114 utilizes near field communications to "push" data to wireless smart card 104. For example, tag writer 114 may be configured to transmit an electronic certificate (e.g., an electronic coupon) to any wireless smart card 104 that enters its surrounding electromagnetic field. In one embodiment, the storing of the tag data in wireless smart card 104 is conducted in accordance to a proprietary format. Notably, the tag data is stored on a pre-designated sector on wireless smart card 104. For example, if the tag data includes MIFARE data, wireless smart card 104 is configured to store the tag data in a designated MI FARE section in memory 112.

In block 306, the wireless smart card is interfaced with a wireless smart device reader at a redemption or point of sale site. In one embodiment, after obtaining coupon data from tag writer 114, wireless smartcard 104 is ultimately interfaced with wireless smart device reader 106 at a point of sale location where the electronic coupon can be redeemed (i.e., a user decides to use/redeem a previously obtained electronic coupon). For example, wireless smart card 104 may be placed in close proximity to wireless smart device reader 106, which may cause the two devices to conduct a handshaking procedure. Notably, power from the electromagnetic field provides the necessary operating power to wireless smart card 104.

In block 308, the wireless smart card sends data to the wireless smart device reader. In one embodiment, wireless smart card 104 transmits the tag data (over an electromagnetic field) to wireless smart device reader 106. For example, CPU 120 instructs transceiver module 118 to transmit tag data (via NFC), which is received by transceiver 124. In one embodiment, the transmitted tag data includes a location identifier that corresponds to tag writer 114 (or smart poster 102) (as well as a time stamp of when the electronic certificate (e.g., coupon) was obtained from tag writer 114.

In block 310, the data is forwarded to a client manager. In one embodiment, transceiver unit 124 forwards the recently acquired tag data to client manager 110.

In block 312, data is forwarded to a back-end server. In one embodiment, client manager 110 transmits transaction data to server 112. In one embodiment, transaction data includes the tag data and reader-specific data, such as a vendor id that identifies either the wireless smart device reader 106 and/or the company/vendor utilizing wireless smart device reader 106. The reader-specific data may also include a second time stamp which records the date and time of the transaction.

In block 314, the received data is used to determine the appropriate electronic certificates that may be applied to the current transaction. In one embodiment, server 112 uses database 128 and the transaction data received from client manager 110 to determine if any applicable coupons, promotions, tickets, etc. can be redeemed or utilized at the point-of sale location. For example, server 112 may include CPU 116 that is used to analyze the transaction data to derive a coupon, ticket, or promotion. In one embodiment, CPU 116 is configured to cross-reference the transaction data with a multitude of entries stored in database 128. For example, if a particular database entry corresponds with the location identifier and the time stamp, then the electronic certificate mapped to that entry may be accessed/identified. If no database entry corresponds with the location identifier and the time stamp, then an applicable electronic certificate does not exist.

In block 316, the certificate is provided to wireless smart device reader 106. In one embodiment, server 112 transmits the certificate data to wireless smart device reader 106 via client manager 110.

In block 318, an option to redeem coupons is provided. In one embodiment, wireless smart device reader 106 provides the user of wireless smart card 104 the option to redeem the certificate (e.g., a coupon) on the purchase transaction. In an alternate embodiment, the wireless smart device reader 106 automatically applies the certificate (e.g., a coupon or ticket) to the transaction.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for storing and redeeming an electronic certificate using an initially unpowered wireless smart card, the method comprising:
   storing tag data on an initially unpowered wireless smart card that is inductively powered when brought into the proximity of an electromagnetic field and that is unpowered when outside of the proximity of the electromagnetic field, wherein storing tag data includes interfacing the initially unpowered wireless smart card with a powered tag writer located on a smart poster for wirelessly communicating the tag data, wherein power from the powered tag writer establishes a first electromagnetic field that is used to activate the wireless smart card and to wirelessly communicate the tag data from the powered tag writer to the wireless smart card and wherein the tag data includes at least one of a certificate identifier and a location identifier;
   receiving the tag data via a wireless transmission from the wireless smart card at a wireless smart device reader during an electronic transaction, wherein the wireless smart card is powered by a second electromagnetic field generated by the wireless smart device reader, and wherein the wireless smart device reader is located at a point of sale site;
   sending, from the wireless smart device reader, transaction data, which includes at least the tag data and a vendor identifier, to a back-end server; and
   at the wireless smart device reader, receiving an electronic certificate from the back-end server, the electronic certificate being obtained by the back-end server using the tag data and the vendor identifier, wherein the electronic certificate includes at least one of an electronic coupon, an electronic ticket, an electronic customer loyalty card, or an electronic promotion.

2. The method of claim 1 wherein receiving tag data includes receiving tag data over the second electromagnetic field via near field communications (NFC).

3. The method of claim 1 wherein the electronic certificate is obtained by the back-end server cross-referencing the transaction data with entries of a certificate database.

4. The method of claim 1 comprising:
   applying the electronic certificate to the electronic transaction.

5. The method of claim 1 comprising:
   querying the user associated with the wireless smart card as to whether the electronic certificate is to be applied to the electronic transaction.

6. The method of claim 1 comprising:
   prior to receiving the tag data from the wireless smart card, interfacing the wireless smart card with the powered tag writer disposed on smart poster; and
   receiving the tag data at the wireless smart card from the powered tag writer.

7. The method of claim 1 wherein the transaction comprises at least one of a coupon redemption transaction, a ticket redemption transaction, and a promotional transaction.

8. The method of claim 1 wherein the wireless smart card wherein the wireless smart card includes one of a device and a card form factor.

9. A system for storing and redeeming an electronic certificate using an unpowered wireless smart card, the system comprising:
- an initially unpowered wireless smart card that is indirectly powered when brought into the proximity of an electromagnetic field and that is unpowered outside of the proximity of the electromagnetic field and that stores tag data received from a powered tag writer;
- a powered tag reader for wirelessly communicating tag data to the initially unpowered wireless smart card, wherein power from the powered tag writer establishes a first electromagnetic field that is used to activate the wireless smart card and to wirelessly communicate the tag data from the powered tag writer to the wireless smart card and wherein the tag data includes at least one of a certificate identifier and a location identifier, and wherein the powered tag reader is located on a smart poster;
- a powered wireless smart device reader for acquiring the tag data, via a wireless transmission, from the wireless smart card during an electronic transaction, wherein the wireless smart card is powered by a second electromagnetic field generated by the wireless smart device reader, for sending transaction data to a backend server, wherein the transaction data includes at least the tag data and a vendor identifier, and wherein the powered wireless smart device reader is located at a point of sale site; and
- a back-end server for receiving the transaction data from the wireless smart device reader, for locating at least one electronic certificate associated with transaction data, and for providing the at least one electronic certificate to the wireless smart device reader, wherein the at least one electronic certificate includes at least one of an electronic coupon, an electronic ticket, an electronic customer loyalty card, or an electronic promotion.

10. The system of claim 9 wherein the wireless smart device reader is configured to acquire the tag data over the second electromagnetic field via near field communications (NEC).

11. The system of claim 9 wherein the at least one electronic certificate is obtained by the back-end server cross-referencing the transaction data with entries of a database.

12. The system of claim 9 wherein the wireless smart device reader is configured to apply the at least one electronic certificate to the electronic transaction.

13. The system of claim 9 wherein the wireless smart device reader is configured to query the user associated with the wireless smart card as to whether the at least one electronic certificate is to be applied to the electronic transaction.

14. The system of claim 9 wherein the wireless smart card is configured to interface with a powered tag writer to receive the tag data.

15. The system of claim 9 wherein the transaction comprises at least one of a coupon redemption transaction, a ticket redemption transaction, and a promotional transaction.

16. The system of claim 9 wherein the wireless smart card includes one of a device and a card form factor.

17. A computer readable medium having stored thereon comprising computer executable instructions that when executed by a processor of a computer performs steps comprising:
- storing tag data on an initially unpowered wireless smart card that is inductively powered when brought into the proximity of an electromagnetic field and that is unpowered when outside of the proximity of the electromagnetic field, wherein storing tag data includes interfacing the initially unpowered wireless smart card with a powered tag writer located on a smart poster for wirelessly communicating tag data, wherein power from the powered tag writer establishes a first electromagnetic field that is used to activate the wireless smart card and to wirelessly communicate the tag data from the powered tag writer to the wireless smart card and wherein the tag data includes at least one of a certificate identifier and a location identifier;
- receiving the tag data via a wireless transmission from the wireless smart device reader during an electronic transaction, wherein the wireless smart card is powered by a second electromagnetic field generated by the wireless smart device reader, and wherein the wireless smart device reader is located at a point of sale site;
- sending, from the wireless smart device reader, transaction data, which includes at least the tag data and a vendor identifier, to a back-end server; and
- at the wireless smart device reader, receiving an electronic certificate from the back-end server, the electronic certificate being obtained by the backend server using the tag data and the vendor identifier, wherein the electronic certificate includes at least one of an electronic coupon, an electronic ticket, an electronic customer loyalty card, or an electronic promotion.

* * * * *